Patented Sept. 16, 1941

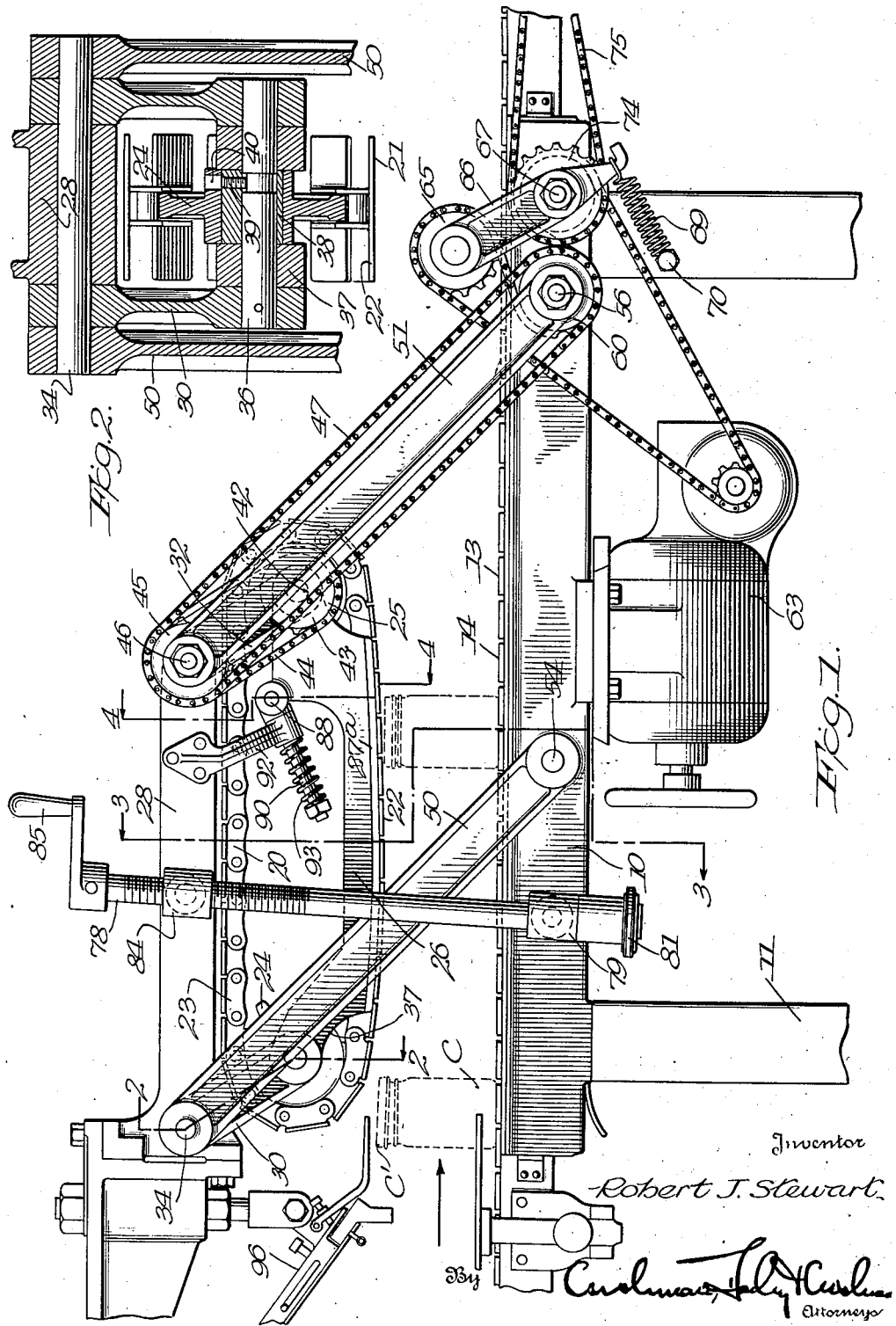

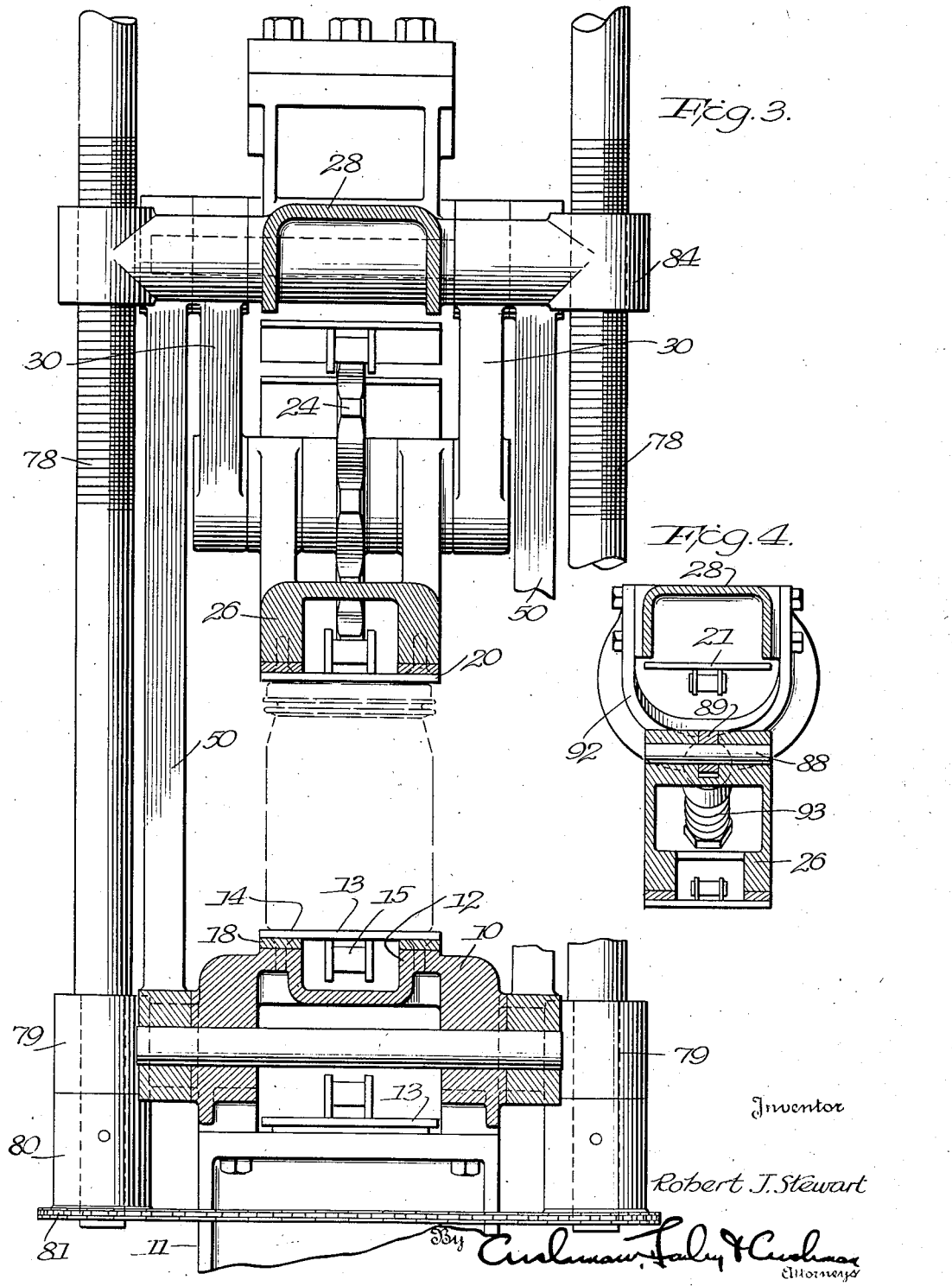

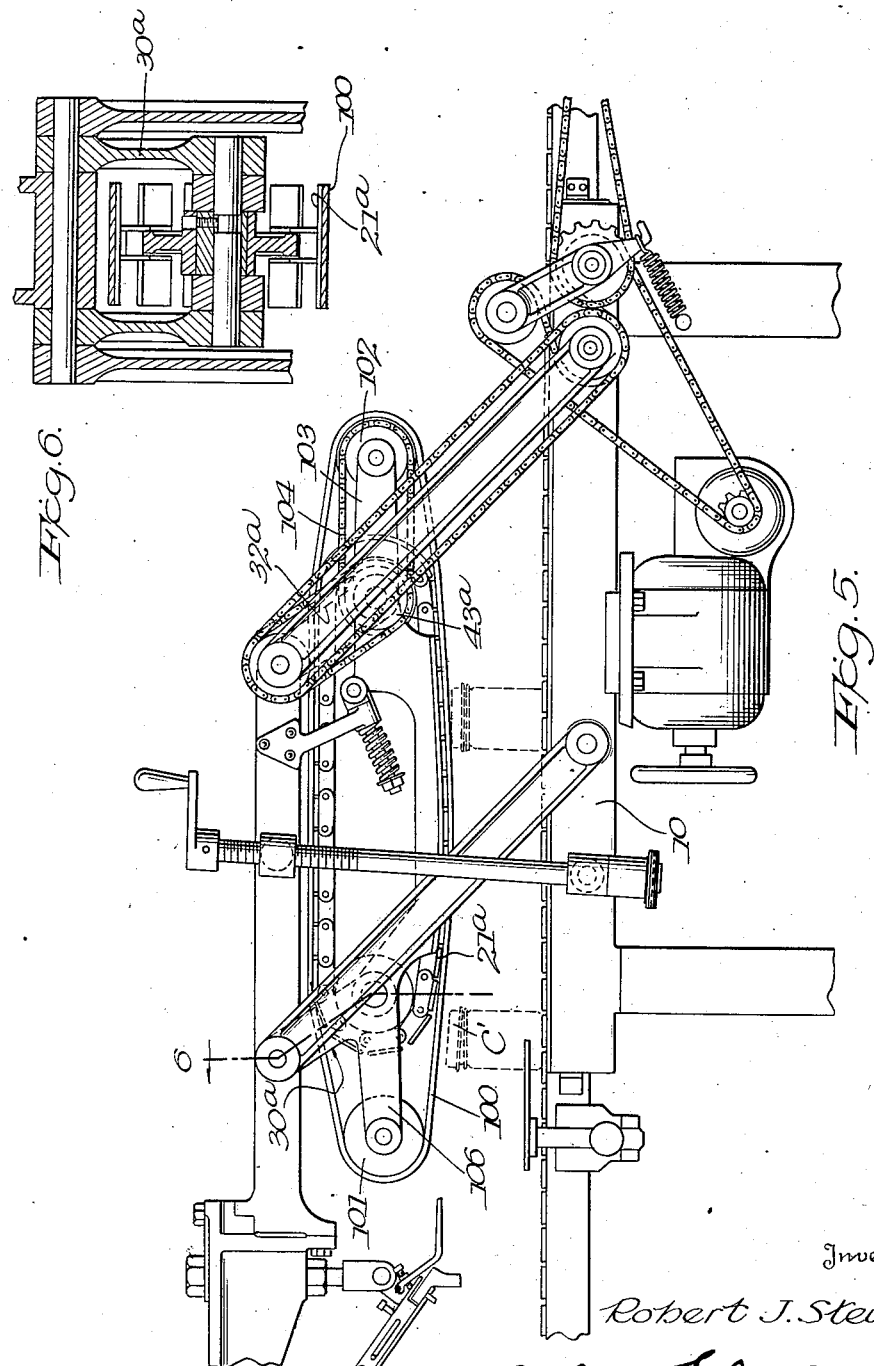

2,256,415

UNITED STATES PATENT OFFICE 2,256,415

CONTAINER SEALING APPARATUS

Robert J. Stewart, Baltimore, Md., assignor to Crown Cork & Seal Company, Inc., Baltimore, Md., a corporation of New York Application August 19, 1938, Serial No. 225,799

18 Claims. (Cl. 226—80)

The present invention relates to a container sealing apparatus.

The principal object of the invention is to provide a sealing apparatus which will properly seal a container without interrupting the movement of the latter.

Mechanisms have heretofore been provided to apply closures to containers while the latter are continuously moving, but such prior mechanisms have not been capable of applying caps to containers with uniformity. Thus, numerous containers have had the caps seated thereon at an angle so that the container was not properly sealed. Another difficulty has been that the prior mechanisms were very apt to cause a container to fall over upon contact therewith.

Another object of the invention is to provide a capping apparatus including a bodily flexible member to engage the container closures so that decorations upon the closures will not be marred and the closures will be more accurately seated upon the containers.

Still another object of the invention is to provide a container sealing apparatus including a sealing element of endless form which is readily adjustable for runs of containers of different height.

Another object of the invention is the provision of a container sealing apparatus including an endless sealing element mounted for movement in a direction upwardly from the containers while exerting a constant pressure upon the latter. The sealing element is also mounted in a novel manner whereby such movement will not change its bodily relation with respect to the container supporting conveyor.

Other objects and advantages of the invention will be apparent from the following specification and drawings, wherein:

Figure 1 is a side elevation of an apparatus of the present invention.

Figure 2 is a detail sectional view on the line 2—2 of Figure 1.

Figure 3 is a vertical sectional view on the line 3—3 of Figure 1.

Figure 4 is a detail sectional view on the line 4—4 of Figure 1.

Figure 5 is a side elevation of a modified form of apparatus, and

Figure 6 is a detail sectional view on the line 6—6 of Figure 5.

Referring to Figures 1 to 4, the numeral 10 designates the stationary table of the machine, which is supported upon legs or uprights 11. As shown in Figure 3, the table 10 has a channel 12 formed in its upper surface. An endless conveyor 13 moves along the table 10, conveyor 13 being formed of a plurality of links, each including a plate-like portion 14 having apertured lugs 15 on its rear or undersurface so that adjacent links may be joined to have pivotal movement with respect to each other and to be engaged and driven by sprockets, not shown.

As is best illustrated in Figure 3, the plate-like elements 14 of the links of chain 13 are of substantial width and the end portions thereof bear upon metal strips 18 secured to the upper surface of the table 10 at each side of the channel 12. The strips 18, as well as the plate elements 14 of the links, are formed of metal having a low coefficient of friction. The lugs and connecting links of the upper run of the chain move in the channel 12. The lower run of the chain 13 moves immediately beneath the table 10, as best shown in Figure 3.

A capping or sealing element or chain 20 of endless form is supported above the table 10, the element 20 being formed of links 21, each including a plate portion 22 and rear lugs 23 by means of which the links may be joined together, and of the same construction as the links of the conveyor chain 13.

The capping or sealing element 20 may be generally described as supported upon two sprocket wheels 24 and 25 carried at each end of a backing element or support 26. The backing element 26 is, in turn, supported from a support or frame 28 by means of pairs of links 30 and 32, one pair of links being pivotally connected to each end of the backing element and frames, respectively.

Referring to Figure 2, which shows in cross section the pair of links 30 provided at the left hand of the backing element, it will be noted that a link 30 is provided upon each side of the supporting frame 28, the upper ends of the two links being pivoted upon a pin 34 journaled in the frame 28. A pin 36 extends through the lower ends of the links 30 and backing element 26, pin 36 being keyed to the links as indicated. This end of the backing element is bifurcated to form a pair of arms 37 through which the pin 36 extends, and an eccentric collar 38 is positioned between the two arms 37. The eccentric collar 38 may be held in adjusted position upon the pin 36 by means of a set screw 39. The sprocket 24 is rotatable upon the eccentric collar 38 and its hub is provided with an aperture 40 through which the set screw 39 is accessible to permit the position of eccentric collar 38 upon pin 36 to be varied to adjust the tension of the chain or sealing element 20.

The sprocket 25 at the right hand end (Figure 1) of the backing element 26 and the links 32 which support that end of the backing element are connected to the frame 28 in a manner similar to that described above in connection with the links 30 except that the sprocket 25 is keyed directly to its supporting pin 42 and without the use of an eccentric collar. Supporting pin 42 also carries a second sprocket 43 at one end of the pin, and outwardly of the adjacent link 32. Sprocket 43 is adapted to be rotated by a sprocket chain 44 which surrounds the same and extends upwardly about one set of sprocket teeth of a double sprocket 45 journaled on a pin 46 extending through the frame 28 and upon which the links 32 are rotatable. The other set of teeth upon double sprocket 45 are engaged by a drive chain 47 operated as hereinafter described.

The frame 28 is mounted upon pairs of links 50 and 51, the pair of links 50 extending between and being pivoted upon a pin 54 in the base 10 and the pin 34 in the frame 28, while the links 51 extend between and are pivoted upon a pin or stub shaft 56 which extends through the base table 10, the upper ends of the links 51 being pivoted upon the pin or stub shaft 46 mounted at the adjacent end of the frame 28. The drive chain 47 extends along one of the links 51 to be driven from one set of teeth upon a double sprocket 60 journaled upon the pin 56. The other set of sprocket teeth upon double sprocket 60 is engaged by a main drive sprocket chain 62 driven through a motor and speed reduction unit 63 supported beneath the base table 10. As shown in Figure 1, the main drive sprocket chain 62 passes about a take-up sprocket 65 carried at the upper end of an arm 66 pivoted upon a pin 67, arm 66 being held outwardly to exert tension upon the chain 62 by means of a spring 69 connected between the lower end of the arm 66 and a bolt 70 secured in the adjacent standard 11 of table 10. Chain 62 also extends about one set of teeth of a double sprocket 74, the other set of teeth upon this latter sprocket carrying a sprocket chain 75 which serves to drive the conveyor chain 13.

It will be observed that by the above construction the frame 28 is part of an arrangement of parallelogram form consisting of the frame itself and the pairs of supporting links 50 and 51, and that the container sealing element 20 is supported within this parallelogram structure.

Since the frame 28 will thus always be parallel with the upper surface of the base 10, the lower run of the sealing element 20 will be similarly positioned. In order to adjust the height of the frame 28 and the sealing element 20 with respect to the base 10, a pair of threaded shafts 78 are provided, one on each side of the frame 28 and base 10. The lower ends of the shafts 78 extend through brackets 79 swivelled upon the base 10 and each shaft 78 carries a small sprocket 80 at its extreme lower end and about which extends, beneath the base 10, a sprocket chain 81. The upper portions of the shafts 78 are threaded in brackets 84 swivelled to the frame 28 and a handle 85 may be provided upon the upper end of each shaft. By rotation of either handle 85, both shafts 78 will be rotated and their threaded engagement with the upper swivel brackets 84 will cause the position of the frame 28 with respect to base 10 to be varied.

The backing element 26 for the endless sealing element or chain 20 is generally supported by the pairs of links 30 and 32 and in order to urge the backing element in a downward and left hand direction (Figure 1), that is, in the direction from which containers C move, element 26 has a pin 88 extending therethrough, which pin pivotally supports a trunnion 89 having a bolt 90 extending outwardly therefrom. Bolt 90 passes through an eye in a U-shaped bracket 92 extending down from the frame 28. A spring 93 surrounds the bolt 90, one end of the spring bearing upon the bracket 92 and the other end bearing against a nut at the free end of bolt 90. By this arrangement, the trunnion 89 and backing element 26 is held against the fixed bracket 92, or in the left hand and downward position illustrated in Figure 1. However, a container moving beneath the endless sealing element 21 may force the element 20 and its backing element slightly upwardly and to the right. In other words, a constant downward tension is exerted upon the containers by the spring and swingable mounting of the backing element 26 with respect to the relatively fixed frame 28.

The lower or body portion 27 of backing element 26 is formed to straddle the lugs and links on the rear surface of chain 20, so that the rear surfaces of the plate elements 22 may bear upon strips 27a which, like the elements 22, are formed of metal having a low coefficient of friction.

In the operation of the apparatus of Figures 1 to 4, a filled container C may be placed upon the endless conveyor 13 by any suitable means and, while moving with the conveyor 13, will remove a cap from a cap feeding mechanism such as that indicated at 96 in Figure 1, which mechanism is of the type described in my application for patent for apparatus for sealing containers, filed August 16, 1938, Serial No. 225,230, and is adapted to lay a skirted closure flat upon the mouth of a container.

After having a cap C' loosely positioned thereon by the mechanism 96 or other such mechanism, the container C will be carried by conveyor 13 beneath the lower run of the capping element 21. It will be observed that the lower surface of the frame 26 is slightly bowed so that a minimum vertical space between the conveyor 13 and the sealing element 20 is provided intermediate the lower run of the element 20. As a result of this, the container C and the cap C' loosely mounted thereon will first move against a slightly downwardly inclined portion of the sealing element 20; will then move beneath a portion of the element 20 which is substantially parallel with the upper surface of conveyor 13, and, finally, will move beneath an upwardly inclined portion of the backing element. As the leading portion of the cap contacts with the lowermost downwardly inclined portion of the backing element, the latter will move upwardly and backwardly, while still exerting force in a downward and forward direction. Hence, there will be no tendency toward causing the cap to tilt. Usually, the backing element 26 will move slightly upwardly as a container moves beneath its lowermost portion, but while still exerting a downward force upon the cap C' to seat the latter upon the container C.

Since the cap will be firmly and properly seated upon the container at least while moving beneath the lowermost portion of backing element 26, the cap will be substantially free of the sealing element 20 when moving beneath the remaining and upwardly inclined portion of backing element 26 so that the cap will not be rearwardly tilted upon the container when moving beneath this portion.

It will be observed that the above construction permits a cap to be firmly and properly sealed upon a container without in any way interrupting the movement of the latter or having any tendency to cause the container to be knocked over.

The above described mounting of the endless sealing element with respect to the container supporting conveyor permits the sealing element to move bodily upwardly, but without changing its substantially parallel relation with respect to the supporting conveyor.

The form of invention disclosed in Figures 5 and 6 is identical with that of Figures 1 and 2 except that the endless sealing element 21a of Figures 5 and 6, which is exactly similar in construction to the endless metal chain 20 of Figures 1 to 4, is surrounded by a belt 100 of fabric or other flexible material, so as to be bodily or inherently flexible. Flexible belt 100 is supported upon rollers 101 and 102, roller 102 being supported at the outer end of an arm 103 projecting from the lower end of supporting link 32a and being driven by a sprocket chain 104 driven by a sprocket connected to rotate with the driving sprocket 43a for endless element 21a. Roller 101 is an idler roll and is mounted between the ends of arms 106, each of which is a lateral extension of the links 30a.

The provision of a flexible container sealing element or belt 100 about the bodily rigid or metal chain 21a gives a greater efficiency in sealing containers because of the bodily flexibility of the belt. That is, the cap C' may more readily adjust itself to a squarely seated position beneath the flexible belt 100, because the cap may move upwardly into the belt, and the flexible belt also assists in preventing any marring of lacquer or printed matter upon the cap.

The above mounting of the belt 100 upon rollers 101 and 102 spaced outwardly of the ends of the chain 21a prevents slippage of the belt with respect to the chain. That is, if the belt 100 closely surrounded the chain 21a, slippage would result because of the fact that the links of the chain 21a spread apart as they move about their supporting sprocket wheels and thus move about an arc of relatively small diameter. By having the belt 100 of greater length than the chain 21a, and driven at proper speed, any difficulty with slippage is avoided.

The manner of operation of the structure shown in Figures 5 and 6 will be apparent from the above description of the structure disclosed in Figures 1 to 4.

It will be apparent that the structures of the present invention may be used to apply various types of closures or caps, for example, (1) caps of the type adapted to be retained upon a container by a vacuum condition in the container alone, or (2) caps of the type which include a container engaging means upon their skirts and which are adapted to be held to the container either by such engaging means alone, or by such engaging means in cooperation with a vacuum condition within the container.

The phraseology used in the specification is for the purpose of description and is not intended to limit the invention, the scope of the invention being indicated in the claims.

I claim:

1. In a container sealing apparatus, a container moving means, a support spaced above said means, an endless sealing element movable along said support, and means to urge said endless sealing element bodily downwardly along a line extending diagonally toward the infeed portion of said container moving means.

2. In a container sealing apparatus, a container moving means, a support spaced above said means, an endless sealing element movable along said support, a flexible lacing belt movable with said sealing element, and means to urge said endless sealing element downwardly toward said container moving means.

3. In a container sealing apparatus, a container moving means, a support spaced above said means, an endless sealing element movable along said support, a flexible lacing belt movable with said sealing element and means to urge said endless sealing element diagonally downwardly toward the infeed portion of said container moving means.

4. In a container sealing apparatus, a container supporting conveyor, a backing element spaced above said conveyor, means to urge said backing element diagonally downwardly toward the infeed end of said supporting conveyor an endless sealing element movable about said backing element with its lower run in contact with the under surface of said backing element, the lower surface of said backing element being downwardly bowed.

5. In a container sealing apparatus, a container supporting conveyor, a support spaced above said conveyor, a backing element carried by said support, link connections between adjacent ends of said support and backing element, an endless sealing element movable about said backing element, and means to urge said backing element and sealing element downwardly.

6. In a container sealing apparatus, a base, a container supporting conveyor, a pair of links pivoted to and extending upwardly from said base, a support pivotally connected to the upper ends of said links, an endless sealing element carried by said support with a portion of its run substantially parallel to said container supporting conveyor, and means to adjust the height of said endless element with respect to said base.

7. In a container sealing apparatus, a base, means to move a container along said base, a pair of longitudinally spaced links pivoted to and extending upwardly from said base, a support pivotally carried by the upper ends of said links, a pair of links extending downwardly from said support, a backing element pivotally supported at the lower ends of said last named links, an endless sealing element carried by said backing element, and means to hold said backing element downwardly with respect to said support.

8. In a container sealing apparatus, a base, means to move a container along said base, a pair of longitudinally spaced links pivoted to and extending upwardly from said base, a support pivotally carried by the upper ends of said links, a pair of links extending downwardly from said support, a backing element pivotally supported at the lower ends of said last named links, an endless sealing element carried by said backing element, and means to adjust said support with respect to said base.

9. In a container sealing apparatus, a base, means to move a container along said base, a pair of longitudinally spaced links pivoted to and extending upwardly from said base, a support pivotally carried by the upper ends of said links, a pair of links extending downwardly from said support on an axis coincident with the pivotal connection of the adjacent first named link to said support, a backing element pivotally supported at the lower ends of said last named links, an endless sealing element carried by said backing element, and means to hold said backing element downwardly with respect to said support.

10. In a container sealing apparatus, a base, means to move a container along said base, a pair of longitudinally spaced links pivoted to and extending upwardly from said base, a support pivotally carried by the upper ends of said links, a pair of links extending downwardly from said support on an axis coincident with the pivotal connection of the adjacent first named link to said support, a backing element pivotally supported at the lower ends of said last named links, an endless sealing element carried by said backing element, driving means extending from said base to said support and from said support to said endless sealing element, said driving means moving about axes coincident with the axes of the pivotal connections of said links.

11. In a container sealing apparatus, a base, means to move a container along said base, a support spaced above said base, a pair of links longitudinally spaced along and depending from said support, said links having a pivotal connection with said support, a backing element pivotally connected at each end thereof to the lower ends of said links, rotatable elements at opposite ends of said backing element, and an endless sealing element movable about said rotatable elements.

12. In a container sealing apparatus, a base, means to move a container along said base, a support spaced above said base, a pair of links longitudinally spaced along and depending from said support, said links having a pivotal connection with said support, a backing element pivotally connected at each end thereof to the lower ends of said links, a resilient element connecting said support and backing element to hold the latter downwardly, and an endless sealing element movable about said backing element.

13. In a container sealing apparatus, a base, means to move containers along said base, a support spaced above said base, rotatable members carried by and longitudinally spaced on said support, an endless sealing element formed of rigid links movable about said rotatable members, a second pair of rotatable members on said support, each positioned outwardly of the adjacent rotatable member of the first pair, and a flexible belt movable about said last named members and in contact with at least the lower run of said endless element.

14. In a container sealing apparatus, a base, means to move containers along said base, an endless sealing element above said means and including a closure engaging portion substantially parallel with said base, and means to support said element for bodily movement away from said base upon contact of a container with said element and to maintain said container engaging portion substantially parallel to said base throughout such movement.

15. In a container sealing apparatus, a base, means to move containers along said base, an endless sealing element above said means and including a closure engaging portion substantially parallel with said base, means to support said element for bodily movement away from said base and to maintain said container engaging portion substantially parallel to said base throughout such movement, and means to urge said element diagonally downward toward the infeed end of said container moving means.

16. In a container sealing apparatus, a base, means to move a container along said base, a support spaced above said base, a pair of links longitudinally spaced along and depending from said support, said links having a pivotal connection with said support, a downwardly bowed backing element pivotally connected at each end thereof to the lower ends of said links, a resilient element connecting said support and backing element to urge the latter diagonally downwardly toward the infeed end of said container moving means, and an endless sealing element movable about said backing element.

17. In a container sealing apparatus, a base, means to move a container along said base, a support spaced above said base, parallel links extending between and pivotally connecting said base and said support to support the latter, a second pair of links longitudinally spaced along and depending from said support, said last named links having a pivotal connection with said support, a backing element pivotally connected at each end thereof to the lower ends of said links, a resilient element connecting said support and backing element to hold the latter downwardly, and an endless sealing element movable about said backing element.

18. In a container sealing apparatus, a base, means to move containers along said base, a support spaced above said base, rotatable elements carried by said support, an endless sealing element formed of rigid links movable about said rotatable members, a second pair of rotatable elements each positioned outwardly of said first named rotatable elements, and a belt of flexible material movable about said second rotatable elements and with and upon the surface of said endless element.

ROBERT J. STEWART.

CERTIFICATE OF CORRECTION.

Patent No. 2,256,415. September 16, 1941.

ROBERT J. STEWART.

It is hereby certified that error appears in the printed specification of the above numbered patent requiring correction as follows: Page 3, second column, lines 9 and 16, claims 2 and 3 respectively, for the word "lacing" read --facing--; and that the said Letters Patent should be read with this correction therein that the same may conform to the record of the case in the Patent Office.

Signed and sealed this 28th day of October, A. D. 1941.

(Seal)
Henry Van Arsdale,
Acting Commissioner of Patents.